Jan. 2, 1923.
W. H. DICKINSON.
AMUSEMENT DEVICE.
FILED OCT. 11, 1922.
1,440,661
4 SHEETS-SHEET 1
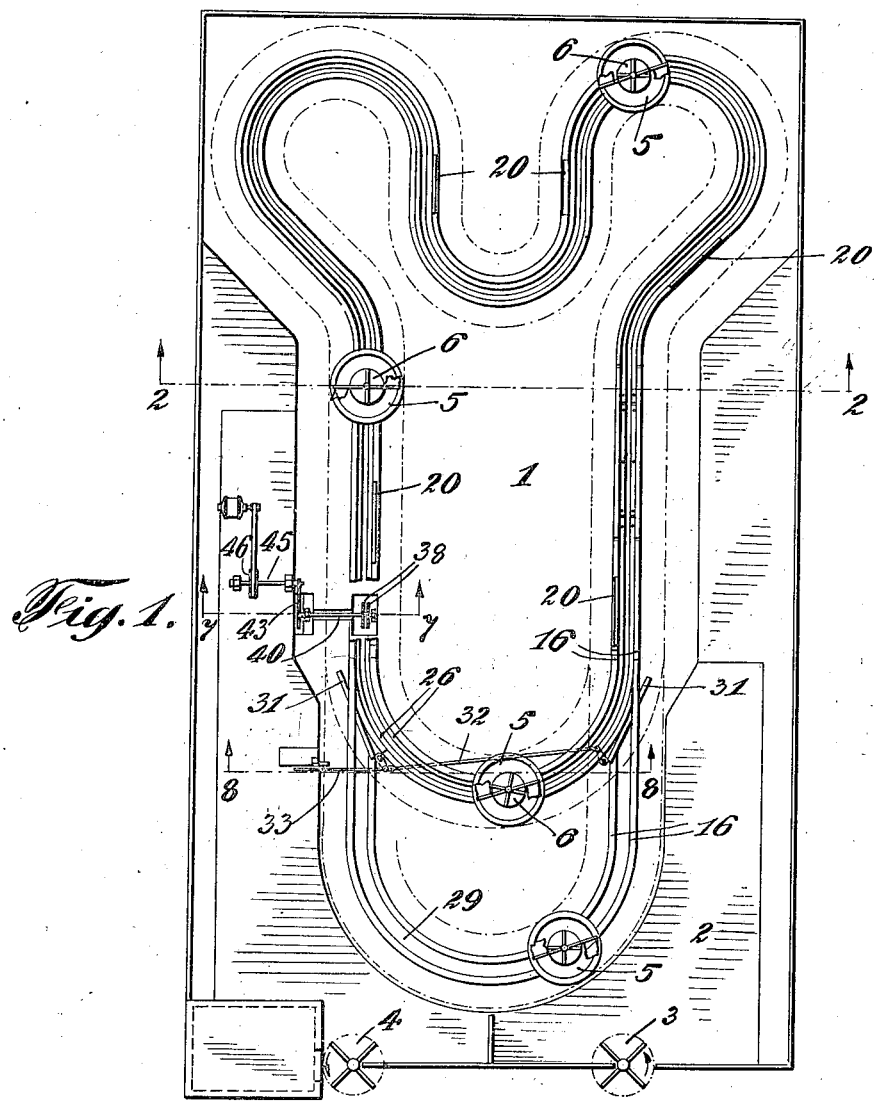
Fig. 1.
Fig. 2.
Inventor
William H. Dickinson
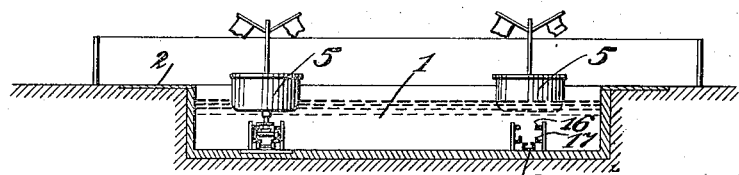
his Attorneys Jan. 2, 1923.
W. H. DICKINSON.
AMUSEMENT DEVICE.
FILED OCT. 11, 1922.
1,440,661
4 SHEETS-SHEET 2
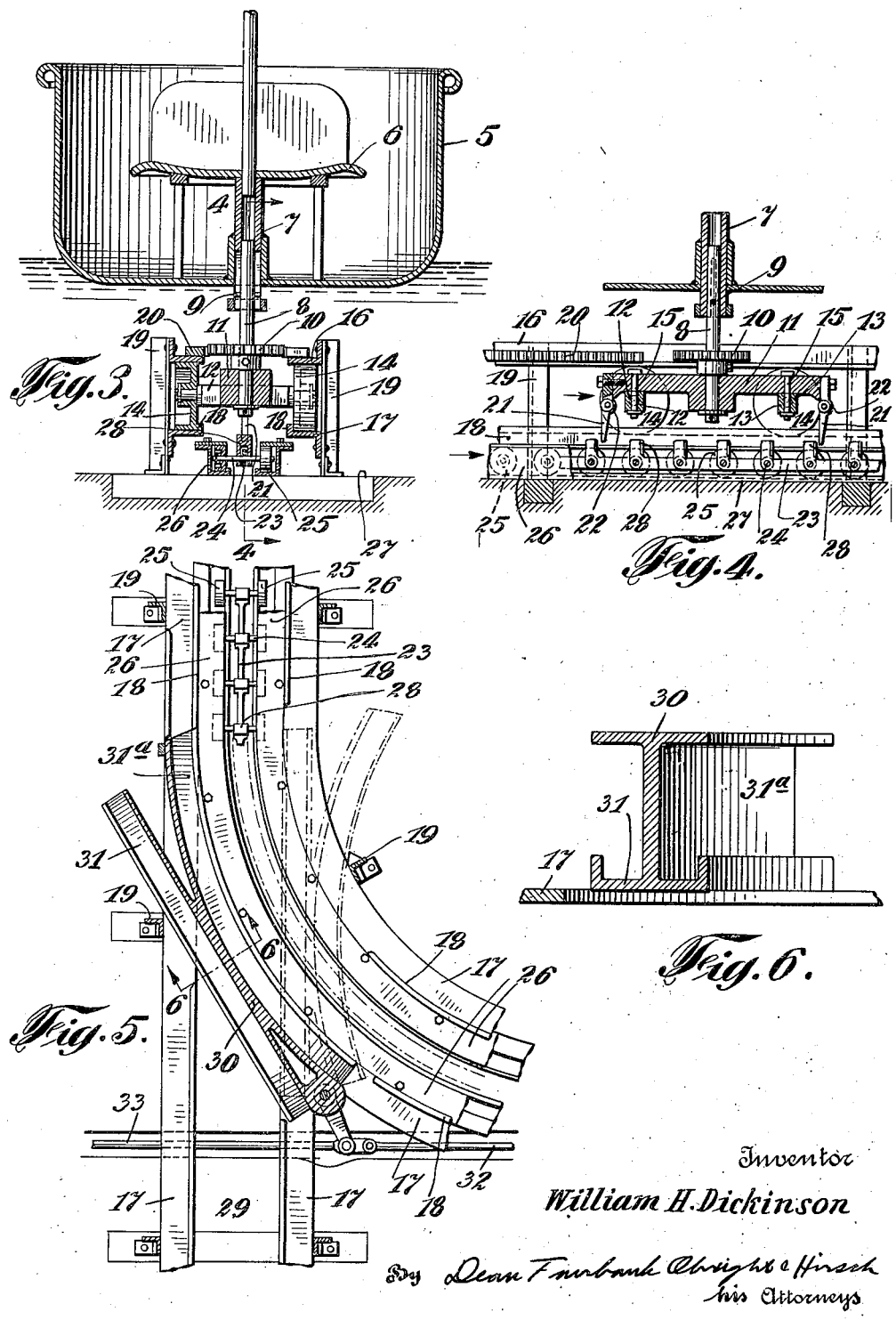
Inventor
William H. Dickinson
By Dean Fairbank Wright & Hirsch
his Attorneys

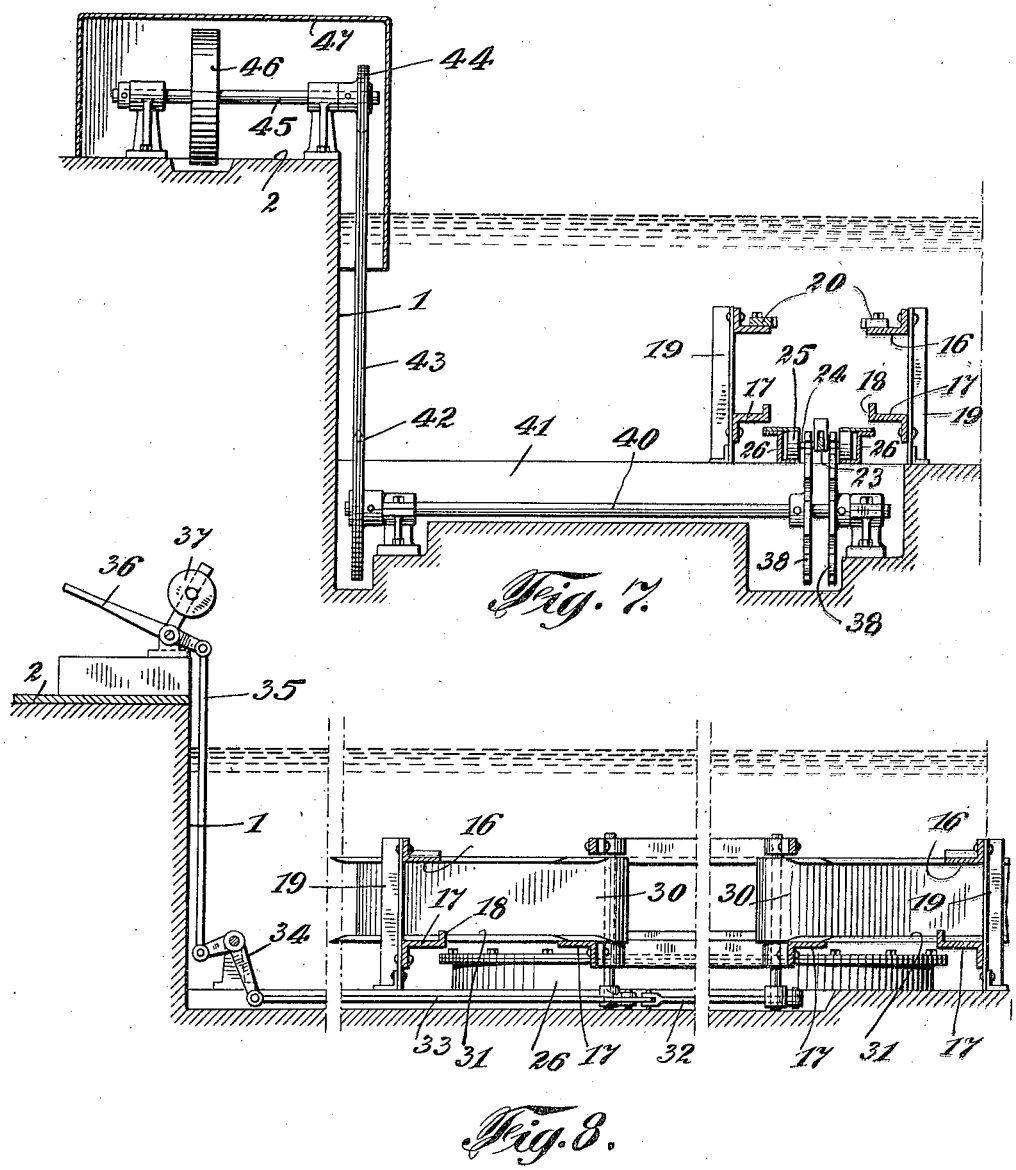

Jan. 2, 1923.
W. H. DICKINSON.
AMUSEMENT DEVICE.
FILED OCT. 11, 1922.
1,440,661
4 SHEETS-SHEET 4
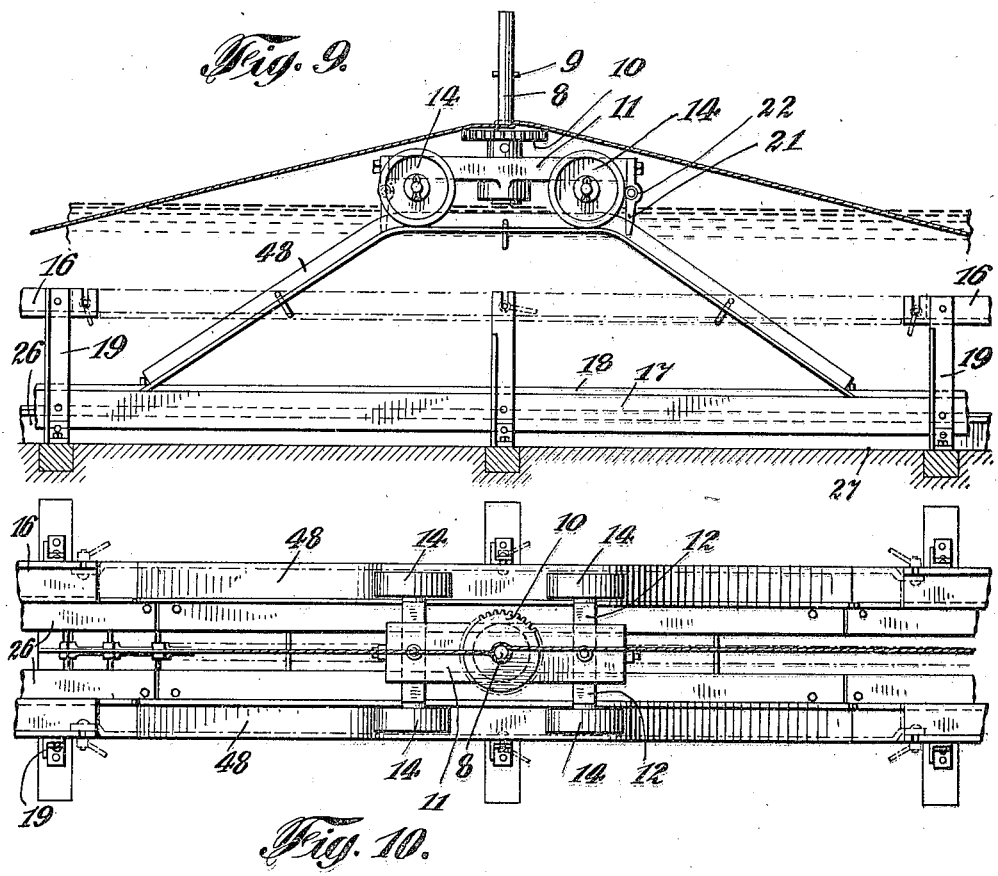
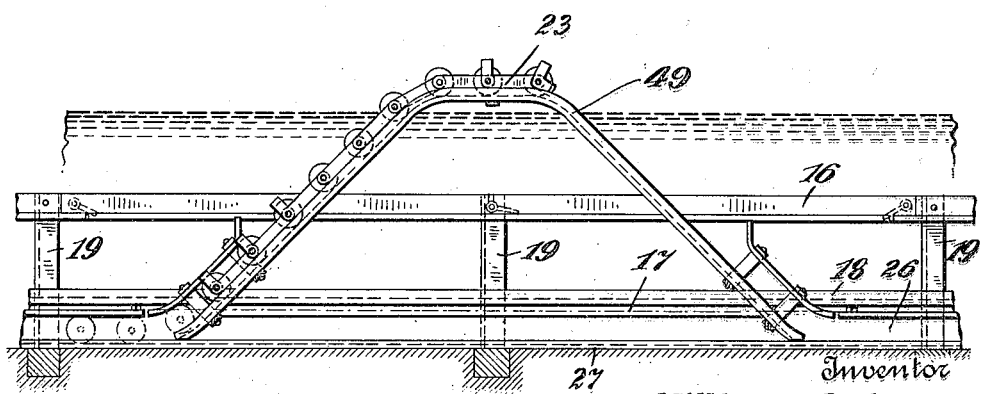
Inventor
William H. Dickinson
By Dean Fairbank Albright & Hirsch
his Attorneys Patented Jan. 2, 1923.

1,440,661

UNITED STATES PATENT OFFICE.

WILLIAM H. DICKINSON, OF NEW YORK, N. Y.

AMUSEMENT DEVICE.

Application filed October 11, 1922. Serial No. 593,669.

*To all whom it may concern:*

Be it known that I, WILLIAM H. DICKINSON, a citizen of the United States, and resident of New York, in the county of Bronx and State of New York, have invented certain new and useful Improvements in Amusement Devices, of which the following is a specification.

This invention is an amusement device by means of which passengers may ride in a floating vehicle supported solely by the water and propelled therein in such a manner as to give peculiar and highly entertaining sensations and to provide a new and highly diverting form of entertainment.

An object of the invention is to provide means permitting each boat to float freely in the water while being propelled through the water along desired paths.

A further object is to provide means whereby the boats at will may be shunted from their regular path of motion for the purpose of receiving and discharging passengers.

A further object is to provide operating means for the boats so constructed that it is substantially hidden from view, thus preventing the passengers from seeing or understanding the mechanism which gives the unusual motion to the boats.

A further object is to provide means whereby the several parts of the operating mechanism may be raised to view for the purpose of inspection whenever desired.

A still further object is to provide means whereby the boats while being propelled along a desired path, are given a peculiar rotary or oscillatory motion while supported solely by the water.

A still further object is to provide means whereby the boats may be moved manually in one direction without regard to the speed of motion of the propelling means in that direction.

A preferred form of the apparatus will be described hereinafter, and is shown in the accompanying drawings. Various details or features may be altered or omitted or replaced by equivalent parts within the scope of my invention, as defined in the appended claims.

In these drawings:

Fig. 1 is a plan view.

Fig. 2 is a vertical section taken on the line 2—2 of Fig. 1.

Fig. 3 is a vertical section taken through one of the passenger-carrying boats and its operating and propelling mechanism.

Fig. 4 is a section taken on the line 4—4 of Fig. 3.

Fig. 5 is a plan view of one of the switches for shunting the boats out of their usual path.

Fig. 6 is a vertical section taken on the line 6—6 of Fig. 5.

Figs. 7 and 8 are vertical sections taken on the lines 7—7 and 8—8 respectively of Fig. 1.

Fig. 9 is a partial elevation showing means for elevating the trucks for inspection.

Fig. 10 is a plan view of the mechanism shown in Fig. 9.

Fig. 11 is a partial elevation of means for elevating the endless chain for inspection.

The apparatus as illustrated includes a water tank 1 of any desired shape, and surrounding at least one end by a platform above the water level. Near one end of the platform 2 are provided a passenger entrance 3 and an exit 4. Floating on the surface of the water are disposed a plurality of passenger-carrying boats 5, which may be of any desired shape but are shown as substantially circular in respect to a vertical axis. They are provided with any desired arrangement of seats 6 for passengers. In the center of the bottom of the boat is a bearing 7 through which extends a vertical shaft 8, on which the boat is free to move vertically. Thus any bodily lateral movement of the shaft will move the boat through the water but the boat will float on the water and is free to move up and down on the waves produced in the water. The shaft and boat are held against relative rotation in any suitable manner as for instance by having the lower portion of the bearing sleeve 7 slotted to receive a pin 9 on shaft 8. This engagement permits the boat to be rotated by the rotation of the shaft 8.

The lower end of the shaft 8 is provided with a gear 10 and is journaled in a carriage body portion 11 provided with axles 12 and 13 on the ends of which are mounted wheels 14. The axles are free to rotate on vertical king bolts 15 fastened to the carriage 11. The carriage wheels are adapted to run in a trackway formed of a pair of superposed spaced plates 16 and 17, the lower plates 17 each having an upturned flange 18 to guide the wheel in the trackway. These track plates are arranged in sections to form a continuous track and are at intervals supported on upright members 19 fastened to the floor of the tank 1.

The upper track plates 16 support rack bars 20 which are shown as spaced sections staggered and alternately disposed to engage with the gear 10 on the shaft 8. The engagement of gear 10 first with a rack bar on one side and then with one on the other side gives to the boats a partial rotation first in one direction and then in the opposite direction. During this oscillation, however, the boats are free to rise and fall on the waves produced in the tank 1, because of the slidable connection between the boats and the shafts 8. The ends of the rack bar sections may be spaced so that there are periods of non-rotation between successive rotary movements as the boat moves along.

The carriages or trucks 11 are provided with one or more dependent arms 21, so pivoted that the lower end may move to swing forward but cannot swing in the opposite direction. For preventing rearward swinging there may be a shoulder 22 engaging the supporting brackets for the arm.

An endless chain or cable 23 is employed for propelling the carriage and boat. This is shown as formed of links connected by pins 24 on the ends of which are wheels 25 engaging a trackway 26 somewhat similar to the trackway above mentioned and disposed therebelow, preferably on a floor 27. Upright elements such as studs or shoulders 28 on the endless chain 23 are adapted to engage with the dependent arm 21 on the carriages 11. Thus the carriages may be moved in the direction of the arrow in Fig. 4 by the movement of the chain 23, and due to the pivoting of the arm 21 the carriage may be moved faster than the chain by other means if desired. The trackways for the carriages and the chain are disposed in an endless path within the tank 1, and may make as many turns or loops as desired. All portions of the main track are preferably so disposed that the boats are spaced from the platform or tank walls.

To facilitate loading and unloading there is a shunt portion of the track for the carriages 11 but not for the track 26 for the chain. This shunt portion 29 is so disposed as to bring the boats close to the edge of the platform or tank wall. To direct the boats into this shunt portion I provide switching means, shown more clearly in Fig. 5. This switching means includes frogs 30 having straight portions 31 and curved portions 31ª. The lower track surfaces of these portions are disposed on a level with the lower plates 17 of the trackway for the carriages. There are two of these frogs one at each end of the shunt track 29, and they are operated simultaneously by a link 32 connecting them. This link is connected to a link 33 and the latter is connected by a bell crank lever 34 to a link 35 operated by a hand lever 36 mounted on the platform 2 adjacent the edge of the tank 1. A weight 37 is mounted on the hand lever 36 and tends to keep it in either limiting position. The normal position is that shown in the drawings, in which the curved members 31ª of the frogs are aligned with the carriage track and the carriages are constrained to move around in their normal endless path. Whenever it is desired to move a boat into the shunt 29 to load or unload passengers, the lever 36 is pushed down and the frogs are moved to align the straight portions 31 thereof with the carriage track, and a carriage is pushed into the shunt by hand and thus disengaged from the chain.

Any suitable means is provided for causing travel of the chain. In Fig. 7 there is shown by way of example a pair of sprocket wheels 38 mounted on a shaft 40 disposed in a depression 41 in the bottom of the tank 1, and engaging with the pins 24 on opposite sides of the chain 23. A sprocket 42 on the shaft 40 engages a chain 43 leading to and from a sprocket 44 mounted on a shaft 45 which is rotated by a drive pulley 46 or any prime mover. A casing 47 covers that part of the power connections which lies above the surface of the water.

As a measure of safety it is desirable that the carriages and the chain be inspected or examined at proper intervals. To permit this I provide the mechanism as shown in Figs. 9, 10 and 11. To permit examination of the carriages I remove a section of the track plate 16 and mount on the lower plate 17 a track plate 48 so curved that when the carriages are run up on it they are partly or wholly above the level of the water in the tank. Since the chain would not engage with the carriage to push it up the incline of the plate 48 I may tie a rope around the shaft 8 of the carriage being examined and fasten the ends of it to the adjacent carriages or to the chain. I then apply the power long enough to run the particular carriage up on the track, and where it may be stopped and readily examined. When I am through with the examination, I run the carriage down into the water, remove the rope and put the regular section of track back where it belongs. The section 48 may be left in place until all of the carriages have been examined in succession.

In inspecting the chain 23 a similar operation is carried out. In this case I remove a section of the track for the chain and substitute therefor a section 49 having an elevated portion to raise the chain up above the water level. The chain can then be run slowly and examined in its entirety. Because of the longer pathway for the chain during this operation, I insert the necessary number of extra links and after the inspection remove these. During chain inspection all the boats may be moved into the shunt track.

I believe that the operation of the various parts of the device is clear from the preceding description, but in brief it is as follows: A plurality of passengers are received in the boat drawn up into the shunt 29 where the edge of the platform 2 is close to the edge of the boat. The boat is then pushed by hand to the main part of the trackway where it is engaged by the chain and propelled around the course. During its travel the boat will rise and fall on the waves and will have an intermittent oscillatory motion due to the action of the rack bars 20. To permit the boats to enter the main path the frogs are held in the position indicated by dotted lines in Fig. 5. When the boats are in the main track, then the frogs are returned to the position shown in solid lines in this same figure. To discharge passengers a switch is swung to cause the boat to enter the shunt and then it may stop. The movement of the boats around in the tank without any apparent means for their propulsion especially in view of their peculiar oscillatory motion, combined with their natural up and down motion, produces novel sensations.

When the carriages or trucks are to be inspected the boats may be lifted off the shafts by any suitable derrick or other means, and permitted to float on the water or placed on the platform. The shaft 8 may extend up through the boats and to some distance thereabove to form a mast, or the mast portion may be separate from the shaft and rigid with the boat.

Having thus described my invention, what I claim as new and desire to secure by Letters Patent is:

1. An amusement device including a water tank, a passenger boat floating therein, an endless track below the surface of the water, a carriage movable along said track, connections between said carriage and the boat permitting the boat to rise and fall, and an endless flexible tension member following the track and connected to said carriage for propelling the latter.

2. An amusement device including a water tank, a passenger boat floating therein, a propelling means below the surface of the water, connections between the propelling means and the boat permitting the boat to rise and fall naturally while being propelled, and means for rotating the boat about a vertical axle while being propelled.

3. An amusement device including a water tank, a passenger boat floating therein, a propelling means below the surface of the water, connections between the propelling means and the boat, and means for rotating the boat about a vertical axle while being propelled.

4. An amusement device including a water tank, a passenger boat floating therein, a bearing sleeve in the bottom of the boat, a shaft on which said sleeve may slide, a carriage on which said shaft is mounted, said carriage being disposed beneath the water, and propelling means disposed beneath the water to engage with the carriage and move the boat.

5. An amusement device including a water tank, a passenger boat floating therein, a bearing sleeve in the bottom of the boat, a shaft on which said sleeve may slide, a carriage on which said shaft is mounted, said carriage being disposed beneath the water, propelling means disposed beneath the water to engage with the carriage and move the boat, and means for rotating the boat.

6. An amusement device including a water tank, a passenger boat floating therein, a bearing sleeve in the bottom of the boat, a shaft on which said sleeve may slide, said shaft and carriage being held against relative rotation, a carriage on which said shaft is mounted, said carriage being disposed beneath the water, and propelling means disposed beneath the water to engage with the carriage and move the boat.

7. An amusement device including a water tank, a passenger boat floating therein, a bearing sleeve in the bottom of the boat, a shaft on which said sleeve may slide, said shaft and carriage being held against relative rotation, a carriage on which said shaft is mounted, said carriage being disposed beneath the water, propelling means disposed beneath the water to engage with the carriage and move the boat, and means for rotating said shaft.

8. An amusement device which includes a boat floating on the surface of a body of water, a bearing sleeve fastened to the bottom of the boat, the lower end of the sleeve being slotted, a shaft extending through the sleeve, a pin on the shaft lying in the slot whereby the sleeve can move along the shaft, and means for rotating said shaft.

9. An amusement device which includes a boat floating on the surface of a body of water, a bearing sleeve fastened to the bottom of the boat, the lower end of the sleeve being slotted, a shaft extending through the sleeve, a pin on the shaft lying in the slot whereby the sleeve can move along the shaft, means lying beneath the water and connected with the shaft to move it along a predetermined path, and means for rotating said shaft.

10. An amusement device which includes a boat floating on the surface of a body of water, a bearing sleeve fastened to the bottom of the boat, the lower end of the sleeve being slotted, a shaft extending through the sleeve, a pin on the shaft lying in the slot whereby the sleeve can move along the shaft, means for rotating said shaft, a carriage beneath the water to which the end of the shaft is connected, and means to move the carriage.

11. An amusement device which includes a boat floating on the surface of a body of water, a bearing sleeve fastened to the bottom of the boat, the lower end of the sleeve being slotted, a shaft extending through the sleeve, a pin on the shaft lying in the slot whereby the sleeve can move along the shaft, means for rotating said shaft, and an endless chain moving beneath the water for advancing the shaft and boat.

12. An amusement device which includes a boat floating on the water, a connection beneath the water and engaging the boat to propel it, means permitting the boat to move up and down with relation to the connection means beneath the water engaging with the connection to cause a rotary motion to be transmitted to the boat, and means for moving the connection along beneath the water.

13. An amusement device including a tank of water, a trackway beneath the water, operating mechanism thereon, a section of track adapted to be substituted for a regular section, and having an upwardly curved portion so that the operating apparatus can be run up the elevated section to a position above the water to be inspected.

14. An amusement device including a tank of water, a trackway beneath the water, an endless chain, carriages on the track to be operated by the chain, a section of track adapted to be substituted for a regular section and having an upwardly curved portion, and temporary connections such as a rope between the carriage to be elevated above the water and adjacent points of the chain to permit the carriage being run up the substituted section of the track.

15. An amusement device including a tank of water, an endless trackway beneath the water, a shunt trackway, a manually operable switch at the end of the shunt, and a boat floating on the water and movable along the path of the track, said boat being adapted to be switched into the shunt to receive and discharge passengers.

16. An amusement device which includes a water tank, an endless chain, and a trackway, both beneath the water, a carriage running in said trackway, a boat supported on the water and connected to said carriage, for movement around the tank but free for up and down movement on the water, dependent members on the carriage engaged by the chain to move the carriage, said members pivoted to permit independent movement of the carriage with respect to the chain in one direction only.

17. An amusement device including a water tank, a trackway beneath the water, a carriage running on said trackway, a shaft projecting up from the carriage, a boat free to slide up and down on the shaft, but held against rotation thereon, a gear on said shaft, and rack bars associated with the trackway and engaging the gear intermittently and from opposite sides to give the boat an intermittent oscillatory motion first in one direction and then in the other.

18. An amusement device including a water tank, a trackway beneath the water, a carriage running on said trackway, a shaft projecting up from the carriage, a boat free to slide up and down on the shaft, but held against rotation thereon, a gear on said shaft, and a rack bar associated with the trackway and engaging the gear for rotating the boat.

19. An amusement device which includes a water tank, a boat floating on the surface of the water, means to propel the boat around the tank, and means to give the boat an intermittent oscillatory motion while being moved around the tank.

20. An amusement device which includes a water tank, a boat floating on the surface of the water, means to propel the boat around the tank, and means to give the boat an intermittent oscillatory motion about a vertical axis while being moved around the tank.

21. An amusement device which includes a water tank, a boat floating on the surface of the water, mechanical means to propel the boat around the tank and in respect to the water, and means to give the boat a rotary motion while being moved around the tank.

22. An amusement device including a tank of water, a main trackway beneath the water, a shunt trackway, a boat floating on the water and movable along the trackway, and an endless flexible tension member extending along said main trackway and having detachable connections with said boat to propel the latter, said connections becoming automatically disengaged upon the boat entering the shunt trackway.

Signed at New York in the county of New York and State of New York this 7th day of October A. D. 1922.

WILLIAM H. DICKINSON.